US008553786B2

(12) United States Patent
Dick (10) Patent No.: US 8,553,786 B2
(45) Date of Patent: Oct. 8, 2013

(54) SYSTEM AND METHOD FOR PILOT TONE ASSISTED SELECTED MAPPING (75) Inventor: Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 588 days.

(21) Appl. No.: 12/720,566

(22) Filed: Mar. 9, 2010

(65) Prior Publication Data
US 2011/0222590 A1    Sep. 15, 2011

(51) Int. Cl.
*H04B 7/10* (2006.01)
*H04L 1/02* (2006.01)

(52) U.S. Cl.
USPC .......................................... 375/260; 375/347

(58) Field of Classification Search
USPC .......................................... 375/355, 347, 260
See application file for complete search history.

(56) References Cited

U.S. PATENT DOCUMENTS

| 3,959,726 | A |   | 5/1976  | Hinoshita et al. |         |
|-----------|---|---|---------|------------------|---------|
| 5,280,295 | A | * | 1/1994  | Kelley et al.    | 342/463 |
| 5,914,981 | A | * | 6/1999  | Veintimilla      | 375/145 |
| 6,535,502 | B1|   | 3/2003  | Brink            |         |
| 7,359,311 | B1| * | 4/2008  | Paranjpe et al.  | 370/203 |
| 2006/0274868 | A1 | * | 12/2006 | Chen et al.   | 375/347 |
| 2008/0287155 | A1 |   | 11/2008 | Xu et al.     |         |

FOREIGN PATENT DOCUMENTS

| JP | 2005-027177     | 1/2005  |
|----|-----------------|---------|
| JP | 2007-195129     | 8/2007  |
| WO | WO 2008/153350 A1 | 12/2008 |

OTHER PUBLICATIONS

Bauml et al., Reducing the peak-to-average power ratio of multicarrier modulation be selected mapping, Electronics Letters, IEE 1996.*
Bauml et al., Reducing the Peak-to-Average Power Ratio of Multicarrier Modulation by Selected Mapping, Electronis Letters, IEEE, 1996.*
Bauml et al., Reducing the Peak-to-Average Power Ratio of Multicarrier Modulation by Selected Mapping, Electronics Letters, IEEE, 1996.*
3GPP, *Support of DTX Signalling for CQU Transmission with Normal CP*, Agenda Item 7.1.2 from 3GPP TSG RAN1 #53 meeting, May 5, 2008, pp. 1/3-3/3, R1-081962, 3GPP Mobile Competence Centre, Sophia-Antipolis Cedex, France.
Altera Corp., *Simulating Altera Devices with IBIS Models*, App. Note 283, Nov. 2003,ver. 1.1, pp. 1-24, Altera Corp., San Jose, California, USA.
Wang, Fei, *Pilot-Based Channel Estimation in OFDM System*, May 2011, pp. 1-95, University of Toledo, Toledo, Ohio, USA.
Zyren, Jim, *Overview of the 3GPP Long Term Evolution Physical Layer*, 3GPPEVOLUTIONWP, Jul. 2007, pp. 1-27, Freescale Semiconductor, Austin, Texas, USA.

* cited by examiner

*Primary Examiner* — Chieh M Fan
*Assistant Examiner* — Wednel Cadeau
(74) *Attorney, Agent, or Firm* — LeRoy D. Maunu (57) ABSTRACT A method is provided for communicating a data value and pilot tone within the same communication sub-carrier of a communication channel. A first reference phase corresponding to a first data value is selected. A pilot tone having the first reference phase is generated. The generated pilot tone is transmitted. The transmitted pilot tone is received. A phase of the received pilot tone is determined. A second data value is determined from the phase of the received pilot tone. The second data value is stored in an electronic storage medium.

16 Claims, 12 Drawing Sheets

SYSTEM AND METHOD FOR PILOT TONE ASSISTED SELECTED MAPPING

FIELD OF THE INVENTION

The present invention generally relates to wireless communications.

BACKGROUND

Multi-carrier modulation techniques, such as orthogonal frequency division multiplexing (OFDM), have become widely used in high-speed wireless communications. By partitioning a wideband fading channel into narrowband channels, OFDM is able to mitigate the detrimental transmission effects such as multipath fading. However, in the time domain OFDM signals suffer from large envelope variations, which are often characterized by the peak-to-average ratio (PAR).

These variations are the result of the cancellation and accumulation of waveform symbols transmitted in different frequency channels. When the phase of all waveform symbols align, a large peak in the combined waveform is created. Large peaks complicate the transmission and reception of the waveform, because transistors have a limited range of operating voltage. If the amplitude of a received waveform is greater than the operating voltage of a transistor, the crest of the waveform is clipped. To avoid clipping high PAR signals, transmission amplifiers must operate at very low power efficiencies. Individual symbols in each channel frequency are transmitted with smaller amplitudes. However, this results in lower signal-to-noise ratios. Smaller individual peaks in each frequency become harder to distinguish from noise, and reflections present on the channel and may corrupt the symbols received by the receiving antenna.

The present invention may address one or more of the above issues.

SUMMARY

In one embodiment of the present invention, a method is provided for communicating a data value and pilot tone within the same communication sub-carrier of a communication channel. A first reference phase corresponding to a first data value is selected. A pilot tone having the first reference phase is generated. The generated pilot tone is transmitted. The transmitted pilot tone is received. A phase of the received pilot tone is determined. A second data value is determined from the phase of the received pilot tone. The second data value is stored in an electronic storage medium.

In another embodiment, the first reference phase corresponding to the first data value is selected by retrieving a phase corresponding to the first data value from a table. The table maps a set of data values to a set of reference phases.

In another embodiment, the second data value is selected from the phase of the received pilot tone by selecting a second reference phase from the set of reference phases. The reference phase that is the closest to the phase of the received pilot tone is selected. The second data value is retrieved from the table corresponding to the second reference phase.

In another embodiment, channel state information is determined from the received pilot tone. The channel state information is stored in an electronic storage medium.

In another embodiment, determining the channel state information from the received pilot tone includes determining a difference between the second reference phase and the phase of the received pilot tone.

In another embodiment, determining the channel state information from the received pilot tone includes determining a difference between an amplitude of the generated pilot tone and an amplitude of the received pilot tone.

In another embodiment, the reference phase of the pilot tone is restricted to a set of phase values consisting of a first phase and a second phase. The first phase and second phases are separated by 180 degrees.

In another embodiment, determining a phase of the received pilot tone includes determining the sign of a real component of the received pilot tone. In response to the sign being positive, the first phase is selected. In response to the sign being negative, the second phase is selected.

In another embodiment, selecting the first reference phase corresponding to the first data value includes selecting the first reference from a set of reference phases and communicating the number of phase values in the set. The second set of phase values are calculated from the communicated number of phase values.

In another embodiment, the reference phase of the pilot tone is restricted to a set of different phases. A third data value having the number of different phases in the set is transmitted and received. The set of reference phases is generated from the third data value.

In another embodiment, the communication channel is trained to establish a synchronized phase. A difference is determined between the phase of the received pilot tone and the second reference phase. In response to the difference being greater than a selected threshold, repeating training and transmitting steps.

In another embodiment, a communication transmitter is provided for pilot tone assisted modulation of data signals. The communication transmitter includes a mapping block, a pilot tone encoding block coupled to the mapping block, and a transmission block coupled to the mapping block and to the pilot tone encoding block. The mapping block is configured to modulate a data signal into a plurality of representations using two or more subcarrier mapping schemes indicated in a mapping index table. The mapping block selects one of the plurality of representations having a peak-to-average power ratio over a period of time lower than a threshold. The pilot tone encoding block selects one or more reference phases corresponding to a binary representation of the mapping scheme of the one representation from the mapping index table. The pilot tone encoding block generates a pilot tone symbol for each of the one or more reference phases. The pilot tone symbol has a phase equal to the reference phase. The transmission block transmits the one representation and the pilot tone symbol on two or more subcarriers.

In another embodiment, the mapping block is further configured to modulate data signals into a plurality of OFDM representations.

In another embodiment, the reference phase is restricted to a set consisting of N phases.

In another embodiment, the pilot tone encoding block divides the binary representation of the mapping scheme into bitgroups of size $\log_2 N$ and selects a reference phase corresponding to each bitgroup.

In another embodiment, the transmission block communicates the number N over the two or more subcarriers.

In another embodiment, a communication receiver is provided for pilot tone assisted demodulation of data signals. The communication receiver includes a signal receiver, a pilot tone decoding block coupled to the signal receiver, and a demapping block coupled to the signal receiver and pilot tone decoding block. The signal receiver is configured to receive one or more signal representations and one or more modulated pilot tone symbols on a plurality of subcarriers. The pilot tone decoding block determines a phase of each of the one or more modulated pilot tone symbols. The pilot tone decoding block also determines a data value from the phase of each modulated pilot tone symbols. For each of the signal representations, the pilot tone decoding block determines a mapping scheme corresponding to a mapping of the one or more signal representations from one or more of the one or more data values. The demapping block demodulates each signal representation using the corresponding mapping scheme to produce a data signal.

In another embodiment, the phase of each of the one or more modulated pilot tone symbols is restricted to a set of values consisting of a first phase and a second phase.

The pilot tone decoding block can determine a phase for each of the one or more modulated pilot tone symbols by determining a real component of each of the modulated pilot tone symbols. In response to the sign of a real component having a positive sign, the pilot tone decoding block selects the first phase. In response to the sign of a real component having a negative sign, the pilot tone decoding block selects the second phase.

In another embodiment, the pilot tone decoding block determines a data value from the phase of each modulated pilot tone symbol by comparing the phase of each of the one or more modulated pilot tone symbols to a set of reference phases. A corrected phase is selected from the set of reference phases for each of the one or more modulated pilot tone symbols. The corrected phase is equal to the reference phase having a value closest to the phase of the modulated pilot tone. The pilot tone decoding block retrieves a data value for each corrected phase from a reference table.

In another embodiment, the set of reference phases contains four reference phases.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

High peak-to average power ratios (PAPR) of the transmit signal is a major drawback of multicarrier transmission approaches such as orthogonal frequency division multiplexing (OFDM) or discrete multi-tone (DMT). Multiple methods have been investigated to reduce the PAPR of a multicarrier signal. One such method, selected mapping (SLM), requires only simple operations in the form of spreading and inverse discrete Fourier transform (IDFT). However, selected mapping of data results in reduced channel capacity since the transmitter must convey to the receiver, on a symbol-by-symbol basis, information about the spreading code that has been employed to construct the transmission waveform. The various embodiments of the present invention provide a method and circuit for conveying the spreading code information to a receiver that does not incur a data rate loss.

Figure 1:
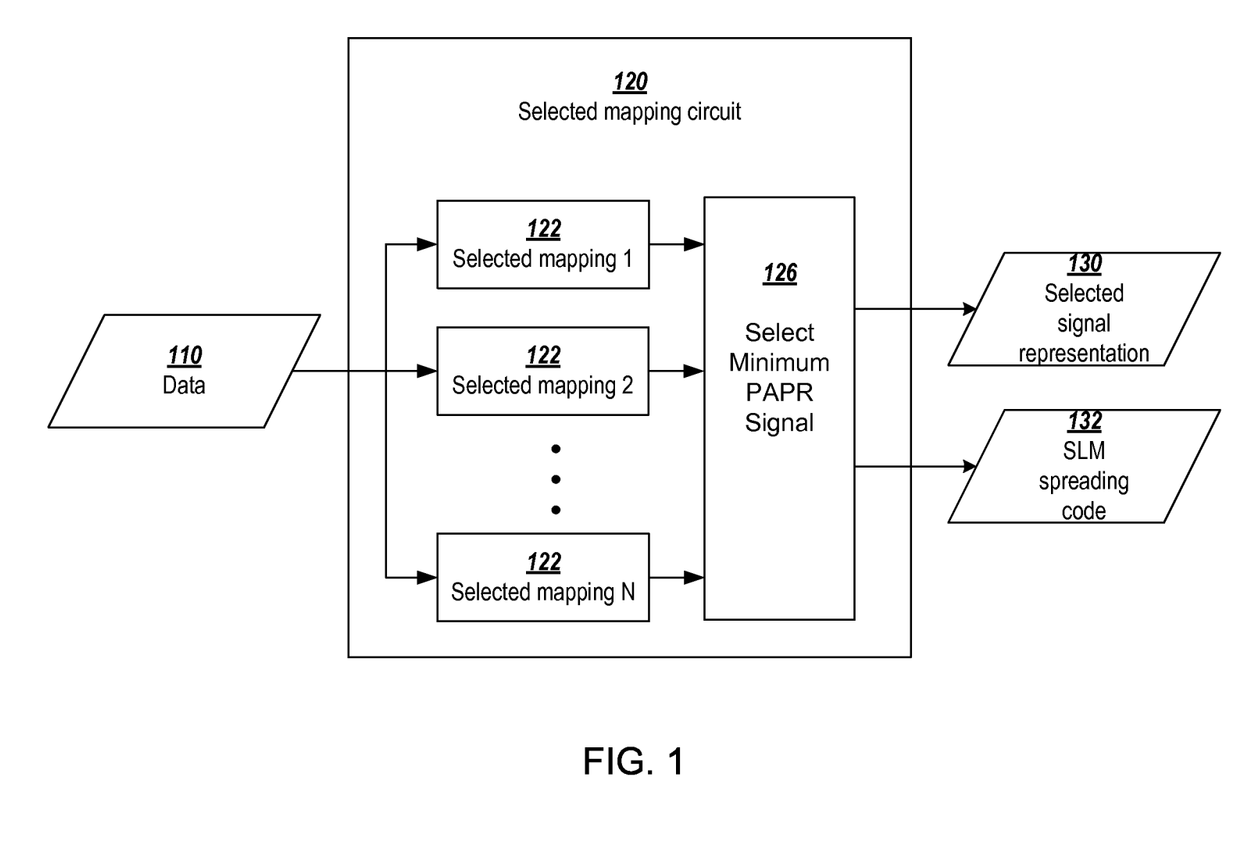
FIG. 1 shows a block diagram of a selected mapping circuit.

FIG. 1 shows a block diagram of a selected mapping circuit. In selected mapping, the selected mapping circuit 120 of a transmitter generates a set of candidate symbol representations of a data block 110 to be transmitted. The set of candidate symbol representations are shown as blocks 122 of selected mappings 1-N. Each data block is multiplied by U different phase sequences, resulting in U modified data blocks. The symbol representation having the lowest peak-to average power ratio 130 is selected for transmission by PAPR analysis and selection block 126. The amount of the PAPR reduction for SLM depends on the number of phase sequences and the design of the phase sequences. To enable demodulation of the modified data block, information about the selected phase sequence is transmitted to the receiver as spreading code 132. As used herein, the selected phase sequence is also referred to as the mapping scheme, the spreading code, or de-spreading code and such terms are used interchangeably herein. At the receiver, the reverse operation is performed to recover the original data block.

While generation of the multiple transmission candidates and the selection process employed to determine the successful candidate are relatively straightforward (albeit high computational complexity), the major drawback of the approach is the requirement to communicate the de-spreading information to the receiver that is required for demodulation of the signal. The transmitted de-spreading information might be the index in a table of spreading codes. For example, to implement SLM with U phase sequences, $\log_2(U)$ side information bits are required for each data block. Current methods allocate a set of sub-carriers in the OFDM symbol to carry this information, resulting in reduced channel data capacity.

Pilot symbols are typically used in communication systems to determine the characteristics or conditions of the communication medium. As used herein, pilot symbols are also referred to as pilot signals or pilot tones, and such terms are used interchangeably herein. During transmission of a waveform, the reflections and interference present on transmission medium may result in a phase shift or decrease in amplitude of the waveform. To efficiently synchronize and process received data waveforms, the channel conditions are periodically determined by the receiver. Channel conditions may include a phase shift, a frequency shift, an amplitude shift, power to noise ratio, etc, The channel conditions may also be referred to as channel state information and such terms are used interchangeably herein.

Figure 2:
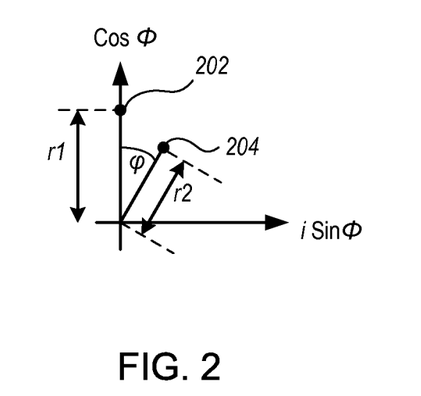
FIG. 2 illustrates the modulation of a transmitted pilot symbol due to channel conditions.

FIG. 2 illustrates a transmitted pilot symbol before 202 and after 204 transmission. Transmitted pilot symbol 202 has amplitude r1 and a set phase. The received pilot symbol has a modified amplitude r2 and has been shifted by a phase φ due to non-ideal channel conditions. Pilot symbols are known beforehand to the transmitter and receiver. As part of the process to track the channel or estimate carrier and phase offsets in the received waveform, the receiver extracts the pilot symbols from the received waveform and compares the received pilot symbol with a known pilot symbol to determine how waveforms are modified by channel conditions.

Figure 3:
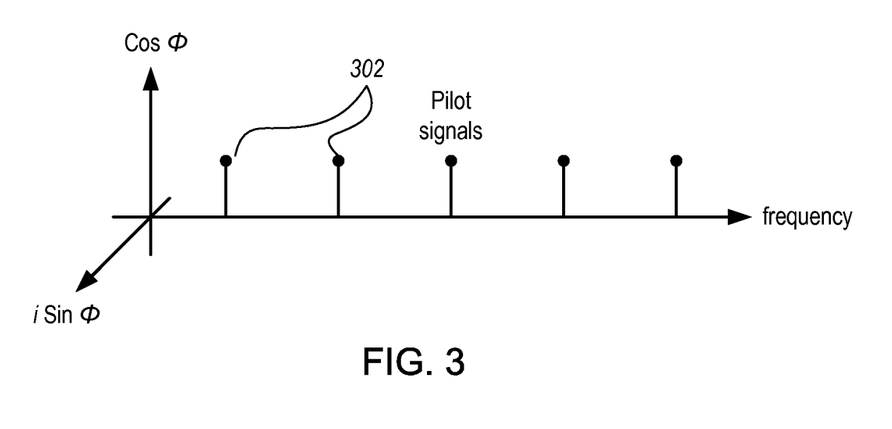
FIG. 3 illustrates several pilot tones transmitted in different channels of a frequency bandwidth.

Channel conditions vary within a given frequency spectrum. Several pilot tones are generally transmitted in different frequencies to determine channel conditions of nearby frequency bands. FIG. 3 illustrates several pilot tones 302 oriented in different channels in a frequency bandwidth.

The various embodiments of the present invention communicate de-spreading information by encoding the de-spreading information onto pilot symbols transmitted by the system so that the pilot symbols not only perform their traditional role in channel tracking but also carry an encoding of the SLM de-spreading code. Because pilot symbols are always transmitted, no additional channel capacity is required.

In one embodiment, the pilot symbols are restricted to a set of pilot symbols known to the transmitter and receiver. As used herein, the set of different pilot symbols may be referred to as a constellation, and such terms are used interchangeably herein. The particular pilot symbol transmitted is selected to encode side channel information. For example, if the pilot symbols are restricted to a set including two pilot symbols, one pilot symbol can be used to represent the binary value '0' and the other can be used to represent the binary value '1'.

The phases of the different pilot symbols in the constellation are equally spaced in the phase domain of a complete cycle (e.g., 0 to 2π). Although a phase shift of a selected pilot symbol may occur due to the channel conditions, the transmitted pilot symbol can be determined by a receiver by performing a nearest neighbor analysis with all pilot symbols in the constellation. As used herein, a known pilot symbol in the constellation may also be referred to as a reference phase or reference pilot symbol, and such terms are used interchangeably herein. The receiver can compare the phase of the received signal with the phases of the known pilot symbols to determine a phase difference for each possible pilot symbol. The reference pilot symbol having a phase that most closely matches the phase of the received symbol is selected as the expected pilot symbol.

The de-spreading information corresponding to the expected pilot symbol can be determined from a look up table or an alternative calculation. Differences between the expected pilot symbol and the received symbol can be used to determine channel state information in the same manner as a traditional pilot symbol.

Figure 4:
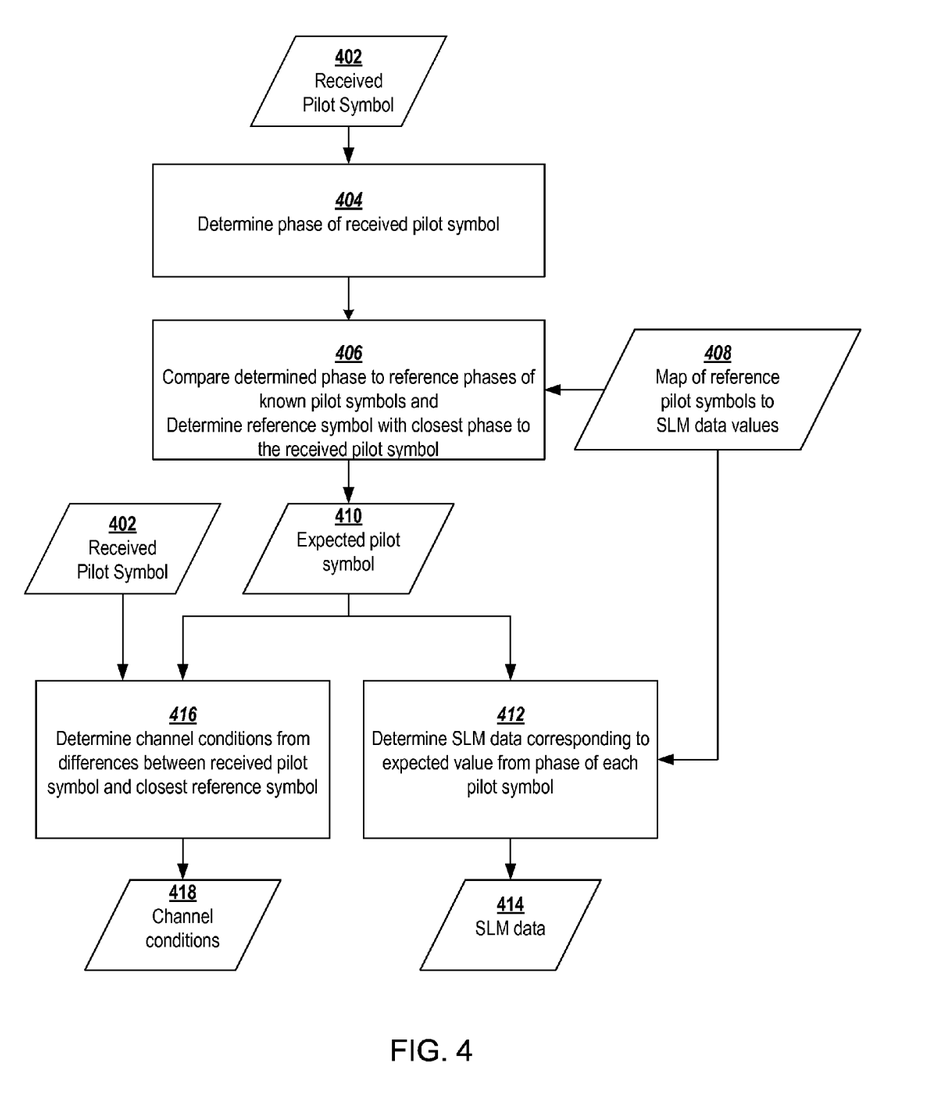
FIG. 4 shows a flowchart of a process for decoding a selected mapping code and extracting pilot tone information from a modulated pilot symbol.

FIG. 4 shows a flowchart of a process for decoding a mapping code and extracting channel state information from a modulated pilot symbol. The phase of a received pilot symbol 402 is determined at step 404. The determined phase is compared to the phases of reference pilot symbols 408 at step 406 to determine the reference pilot symbol having the phase closest to the phase of the received pilot symbol 402. The reference pilot symbol having the closest phase is the expected pilot symbol 410.

The selected mapping de-spreading code 414 is determined from the expected pilot symbol 410 and map 408 at step 412. The map 408 contains phases of pilot symbols and associated mapping de-spreading codes. Channel conditions 418 are determined from differences between the received pilot symbol 402 and the expected pilot symbol 410 as discussed above at step 416.

Figure 5:
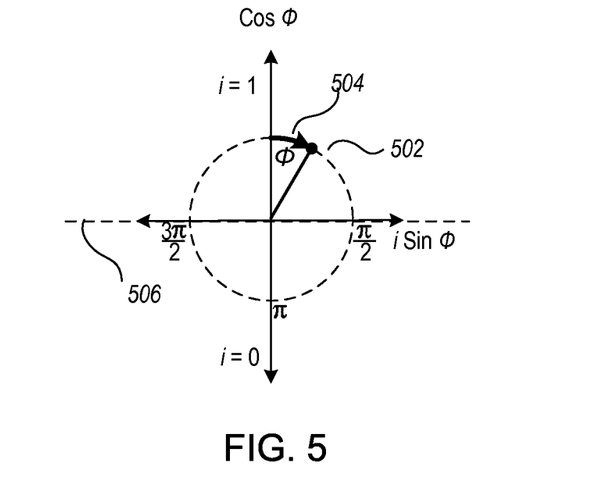
FIG. 5 shows a graph of a binary phase shift keying (BPSK) constellation map that may be used in accordance with various embodiments of the invention.

The constellation of pilot symbols may contain any number of pilot symbols. Each symbol in the constellation corresponds to a range of phases (φ) in the phase domain of a complete cycle (0 to 2π). FIG. 5 shows a graph of a binary phase shift keying (BPSK) constellation map that may be used in accordance with various embodiments of the invention. In this constellation system, the phase domain is divided into two ranges corresponding to two constellation values (i=0,1). A received pilot symbol 502 is shifted by a phase φ (504). In this example, the phase ranges corresponding to each pilot symbol are separated by domain boundary 506. For a given phase of a received pilot symbol, the data value i corresponding to the phase φ is given by:

$$i(\phi) = \begin{cases} 1, & \frac{-\pi}{2} < \phi < \frac{\pi}{2} \\ 0, & \frac{\pi}{2} < \phi < \frac{3\pi}{2} \end{cases}$$

Figure 6:
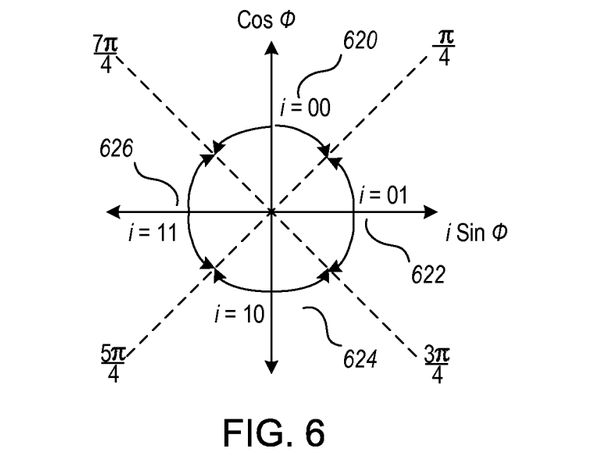
FIG. 6 shows a graph of a quadrature phase shift keying (QPSK) constellation map that may be used in accordance with various embodiments of the invention.

FIG. 6 shows a graph of a quadrature phase shift keying (QPSK) constellation map that may be used in accordance with various embodiments of the invention. In this constellation system, the phase domain is divided into four ranges corresponding to four data values i=00 (620), 01 (622), 10 (624), and 11 (626). For a given phase of a received pilot symbol, the data value i is given by:

$$i(\phi) = \begin{cases} 00, & \frac{-\pi}{4} < \phi < \frac{\pi}{4} \\ 01, & \frac{\pi}{4} < \phi < \frac{3\pi}{4} \\ 10, & \frac{3\pi}{4} < \phi < \frac{5\pi}{4} \\ 11, & \frac{5\pi}{4} < \phi < \frac{7\pi}{4} \end{cases}$$

It is understood that the orientation of the phase ranges shown in FIGS. 5 and 6 are arbitrary. The phase ranges may be rotated to any orientation in the constellation that is known to the transmitter and the receiver. This approach is applicable to a number of modulation techniques utilizing any number of sub-carriers.

As discussed above, any number of reference phases may be used. The number of reference phases included in the constellation is a tradeoff between data capacity and resilience against channel conditions. If a large number of reference phases are used, more pilot symbols can be implemented to represent more de-spreading codes. However, as the phase domain is divided into more phase ranges, there is an increased risk that channel conditions will shift the phase of a pilot symbol from one phase range to another. If the received pilot symbol has a phase that is near an end of a phase range, the receiver may not be able to guarantee a properly inferred value. In some embodiments of the present invention, a guard band, where i does not correspond to a valid data value, is placed between each phase range in the constellation.

Figure 7:
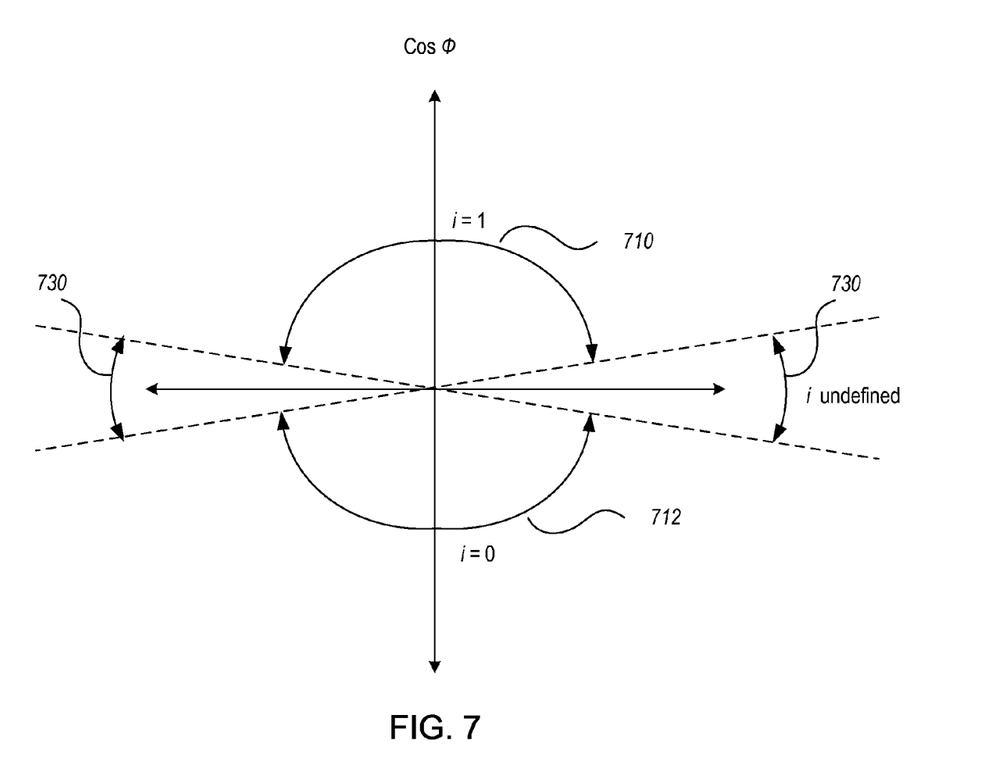
FIG. 7 shows a BPSK constellation map having guard bands placed between the phase ranges of the two constellations.

FIG. 7 shows a BPSK constellation map having guard bands placed between the phase ranges of the two reference phases. In this example, a first phase range 710 corresponds to the constellation value i=1 and a second phase range 712 corresponds to the constellation value i=0. Guard bands 730 are phase ranges that do not correspond to a valid constellation value. Depending on the implementation, if a received pilot symbol has a phase that falls within one of the guard bands, the receiver may require the data block and corresponding pilot symbol be retransmitted.

Multiple pilot symbols may be transmitted to represent spreading code values that are larger than the number of possible pilot symbols. For example, if a BPSK constellation map is used, one pilot symbol can be used to represent each binary digit in a spreading sequence.

Figure 8:
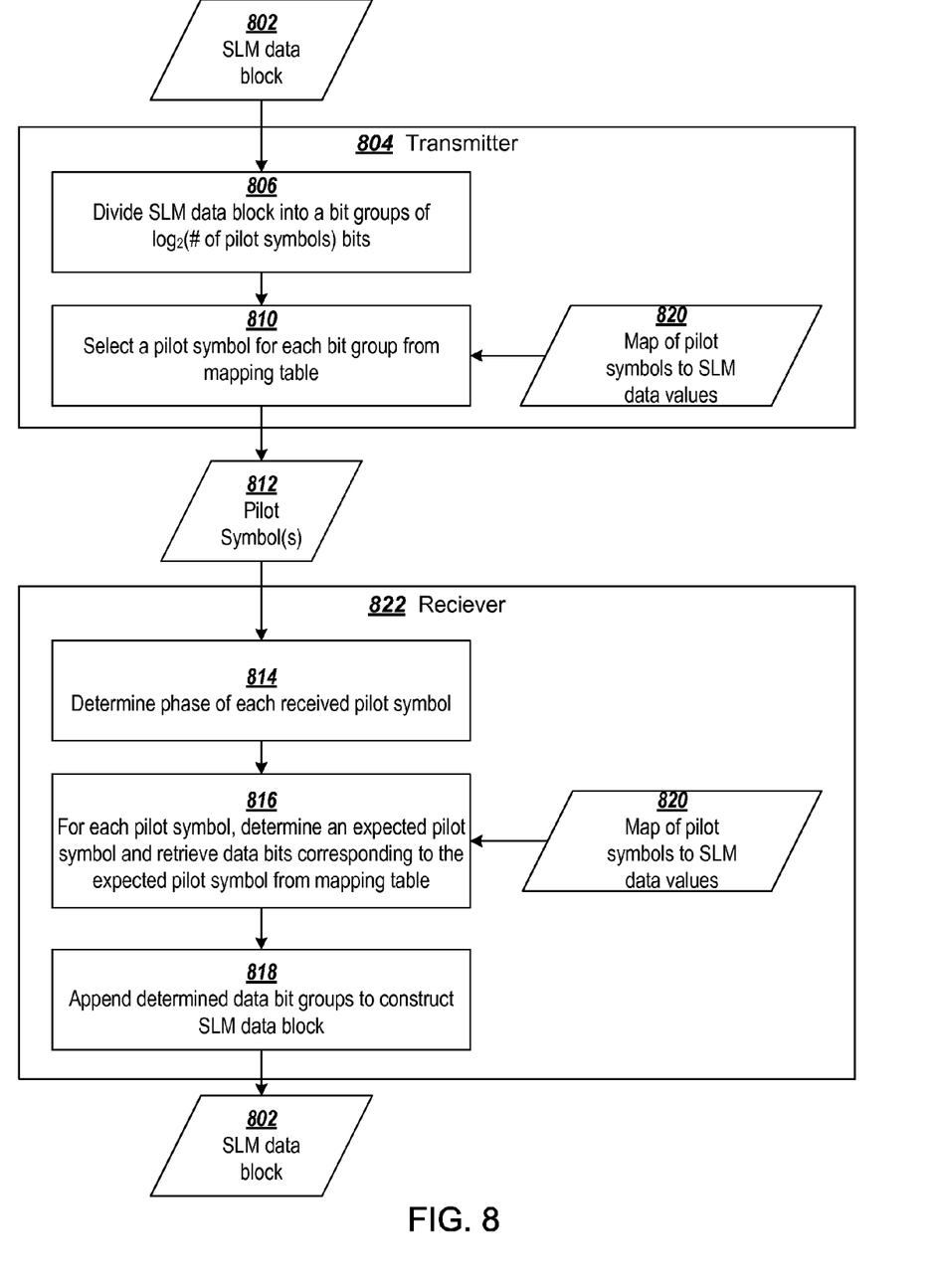
FIG. 8 shows a flowchart of a process for encoding and decoding using multiple pilot symbols to represent an SLM data block.

FIG. 8 shows a flowchart of a process for encoding and decoding using multiple pilot symbols to represent an SLM data block. A selected mapping data block 802 is subdivided by transmitter 804 into bit groups that can each be represented by a single pilot symbol at step 806. If X different pilot symbols are used, each pilot symbol can represent $\log_2(X)$ different de-spreading code values. If the number of different pilot symbols equals a power of two, binary de-spreading code values can easily be subdivided into bit sequences of size $\log_2(X)$.

A pilot symbol is determined from a map 820 of pilot symbols to SLM data values for each bit group at step 810 to produce a number of pilot symbols 812 corresponding to the bit groups. The pilot symbols 812 are transmitted to the receiver 822. The receiver determines the phase of each received pilot symbol 812 at step 814. For each pilot symbol, an expected pilot symbol is determined, and SLM data bits corresponding to the expected pilot symbol are retrieved from map 820 at step 816. The expected pilot symbol is determined by comparing the phase of the received pilot symbol with the phases of reference pilot symbols listed in map 820 as described in FIG. 4. The reference pilot symbol having the closest phase is selected as the expected pilot symbol. The selected mapping data block 802 is constructed by appending the determined data bits groups.

Figure 9:
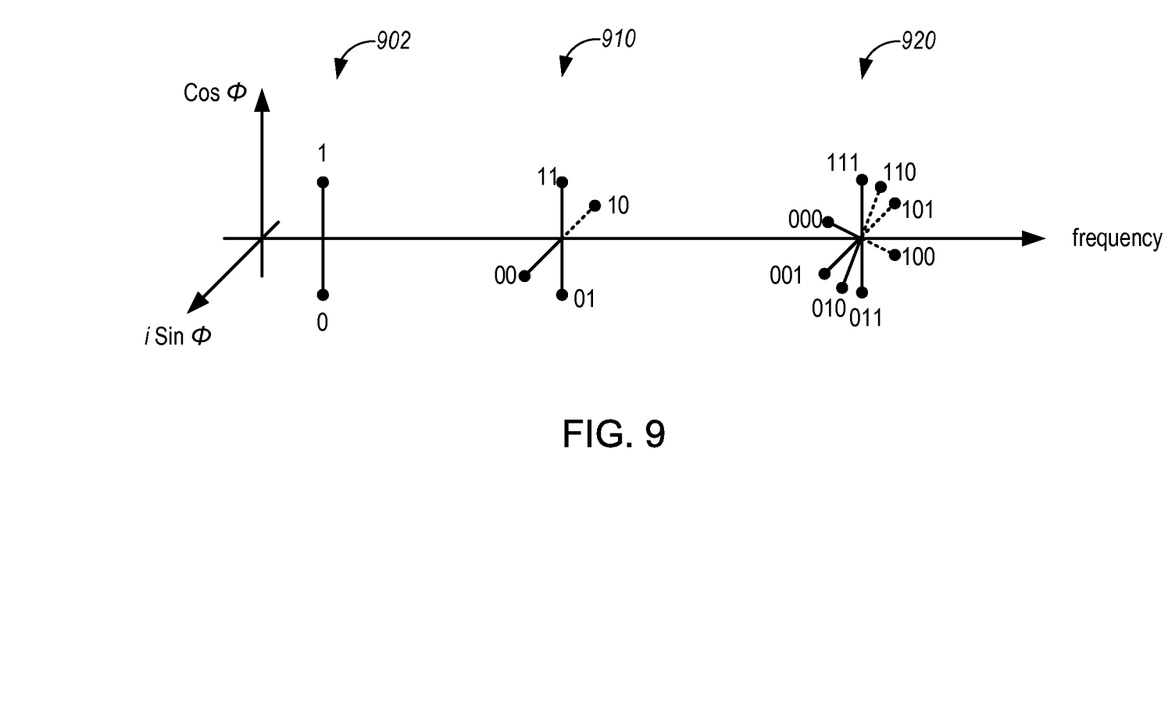
FIG. 9 shows three different phase constellations that may be used in accordance with various embodiments of the invention.

FIG. 9 shows an example of three different phase constellations that may be used in accordance with various embodiments of the invention. Constellation 902 shows the different phases and corresponding data values that may be used in a BPSK constellation map. Constellation 910 shows the different phases and corresponding data values that may be used in a QPSK constellation map. Constellation 920 shows the different phases and corresponding data values that may be used in a third-order constellation map (e.g. $2^3$=8 possible values).

Figure 10:
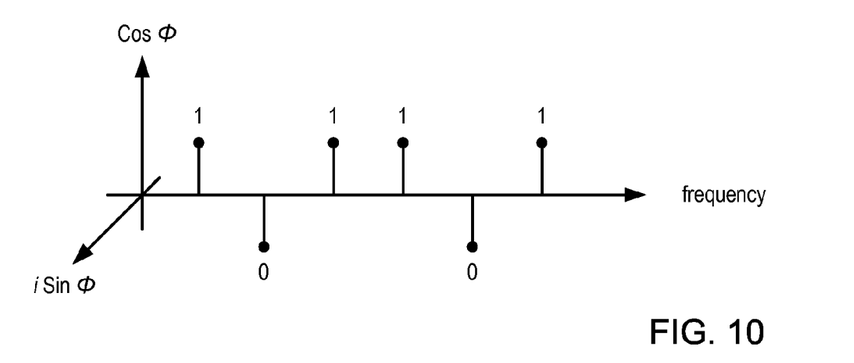
FIGS. 10, 11, and 12 show an example representation of the SLM data block value '101101' using each of the respective constellation arrangements.
Figure 11:
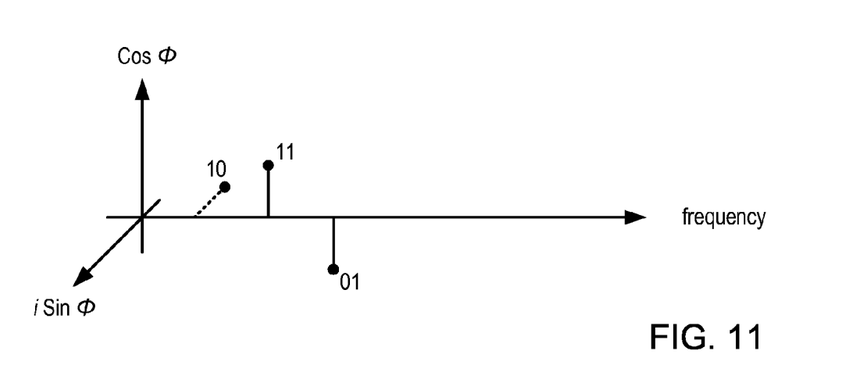
Figure 12:
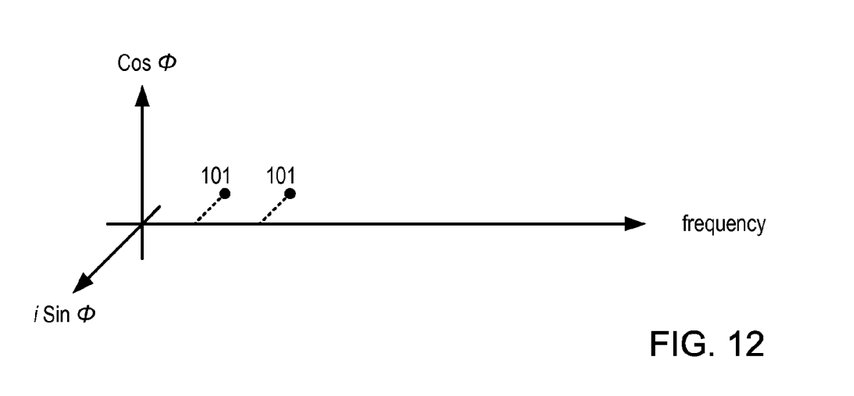

FIGS. 10, 11, and 12 show example representations of the SLM data block value '101101' using each of the respective constellations 902, 910, and 920 shown in FIG. 9.

The representation in FIG. 10 uses one of two possible phases to represent each pilot symbol. Each bit of the data block can be represented with one pilot symbol. Therefore, six pilot tones are required to represent the data block '101101'. The map of phases and corresponding data values are shown in Table 1.

TABLE 1

| Data | Phase |
|------|-------|
| 1    | 0     |
| 0    | 180   |

Table 1 corresponds to the reference constellation 902 of FIG. 9. Substituting a pilot symbol with the appropriate phase for each bit of the data block yields the six pilot symbol encoding shown in FIG. 10.

FIG. 11 shows a pilot symbol encoding of the data block '101101' using the phases shown in the reference QPSK constellation map 910 of FIG. 9 to represent each pilot symbol. The map of phases and corresponding data values is shown in Table 2.

TABLE 2

| Data | Phase |
|------|-------|
| 11   | 0     |
| 10   | 90    |
| 01   | 180   |
| 00   | 270   |

One of four possible phases is used to represent each pilot symbol. Therefore, each pilot symbol can represent two ($\log_2(4)$=2) bits of the data block. The data block '101101' is subdivided into bit groups '10', '11' and '01' and pilot symbols having phases corresponding to each bit group are selected to yield the three pilot symbol encoding shown in FIG. 11.

FIG. 12 shows a pilot symbol encoding of the data block '101101' using the phases shown in the third-order constellation map 920 of FIG. 9 to represent each pilot symbol. The mapping table of phases and corresponding data values is shown in Table 3.

TABLE 3

| Data | Phase |
|------|-------|
| 111  | 0     |
| 110  | 45    |
| 101  | 90    |
| 100  | 135   |
| 011  | 180   |
| 010  | 225   |
| 001  | 270   |
| 000  | 315   |

One of eight possible phases are use to represent each pilot symbol. Therefore, each pilot symbol can represent three ($\log_2(8)$=3) bits of the data block. The data block '101101' is subdivided into bit groups '101' and '101' and pilot symbols having phases corresponding to each bit group are selected to yield the two pilot symbol encoding shown in FIG. 12.

Any order of constellation mapping may be used to represent bit groupings and any number of pilot symbols may be used to represent a SLM data block as required by a particular communication system. The ideal arrangement may depend on channel conditions, channel capacity available, implementing hardware, the selected mapping architecture, etc. Those skilled in the art will recognize the invention is also applicable to other phase shift keying (PSK) variations such as differential phase-shift keying (DPSK) and offset QPSK (OQPSK).

Although the embodiments have been primarily been described in terms of a predetermined set of reference pilot symbols known to the transmitter and receiver, the invention is not so limited. The set of pilot symbols may be negotiated and transmitted at initialization of a communication session. In one embodiment, the pilot symbol constellation can be constructed by the receiver from a data value containing the number of pilot symbols in the set.

Figure 13:
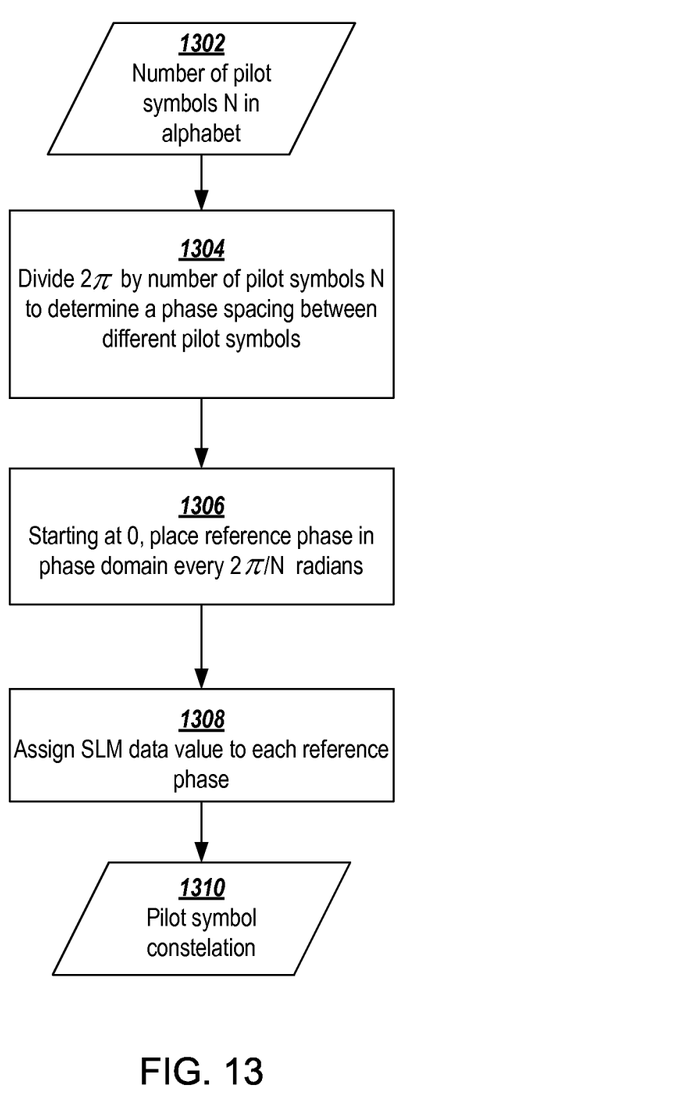
FIG. 13 shows a flowchart of a process for constructing a pilot symbol constellation that may be implemented by a transmitter or a receiver in accordance with various embodiments of the invention.

FIG. 13 shows a flowchart of a process for constructing a pilot symbol constellation that may be implemented by a transmitter or a receiver in accordance with various embodiments of the invention. The number of different pilot symbols 1302 is selected by the transmitter or received by the receiver, accordingly. The phase domain of a complete period ($2\pi$) is divided by the number of pilot symbols 1302 at step 1304 to determine a phase spacing ($2\pi/N$) between pilot symbols. Starting at phase 0, or other selected phase, reference phases are placed in the phase domain every ($2\pi/N$) radians at step 1306. SLM data values are assigned to each reference phase at step 1038 to create the pilot symbol constellation 1310.

Figure 14:
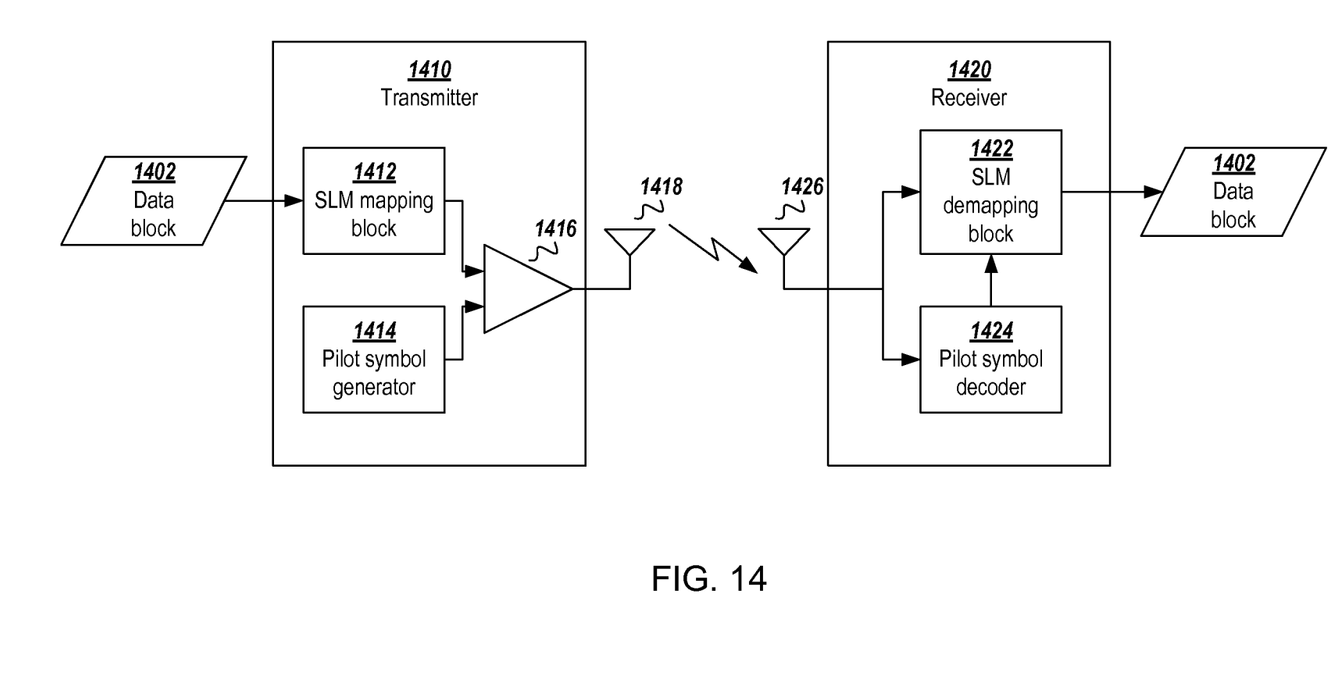
FIG. 14 illustrates a block diagram of an example wireless communication system with pilot tone encoding implemented in accordance with various embodiments of the present invention.

FIG. 14 illustrates a block diagram of an example wireless communication system with pilot tone encoding implemented in accordance with various embodiments of the present invention. A transmitter 1410 includes an SLM mapping block 1412 and a pilot symbol generator 1414. The SLM mapping block 1412 multiplies data block 1402 by a number of phase sequences to generate several candidate representations of the data block. The SLM mapping block 1412 selects the representation having the lowest PAPR and passes the corresponding de-spreading information to pilot symbol generator 1414. Pilot symbol generator 1414 encodes the de-spreading information onto one or more pilot symbols as discussed above. The SLM encoded data and pilot symbols are transmitted to receiver 1420 via amplifier 1416 and antenna 1418.

Receiver 1420 includes a SLM decoder 1422 and a pilot symbol decoder. The transmitted signals are received by antenna 1426. The pilot symbol decoder 1422 determines the transmitted pilot symbols from the received pilot symbols and constructs the de-spreading information as discussed above. The SLM demapping block 1422 receives and demodulates the SLM encoded data using the despreading information and outputs the demodulated data block 1402.

Figure 15:
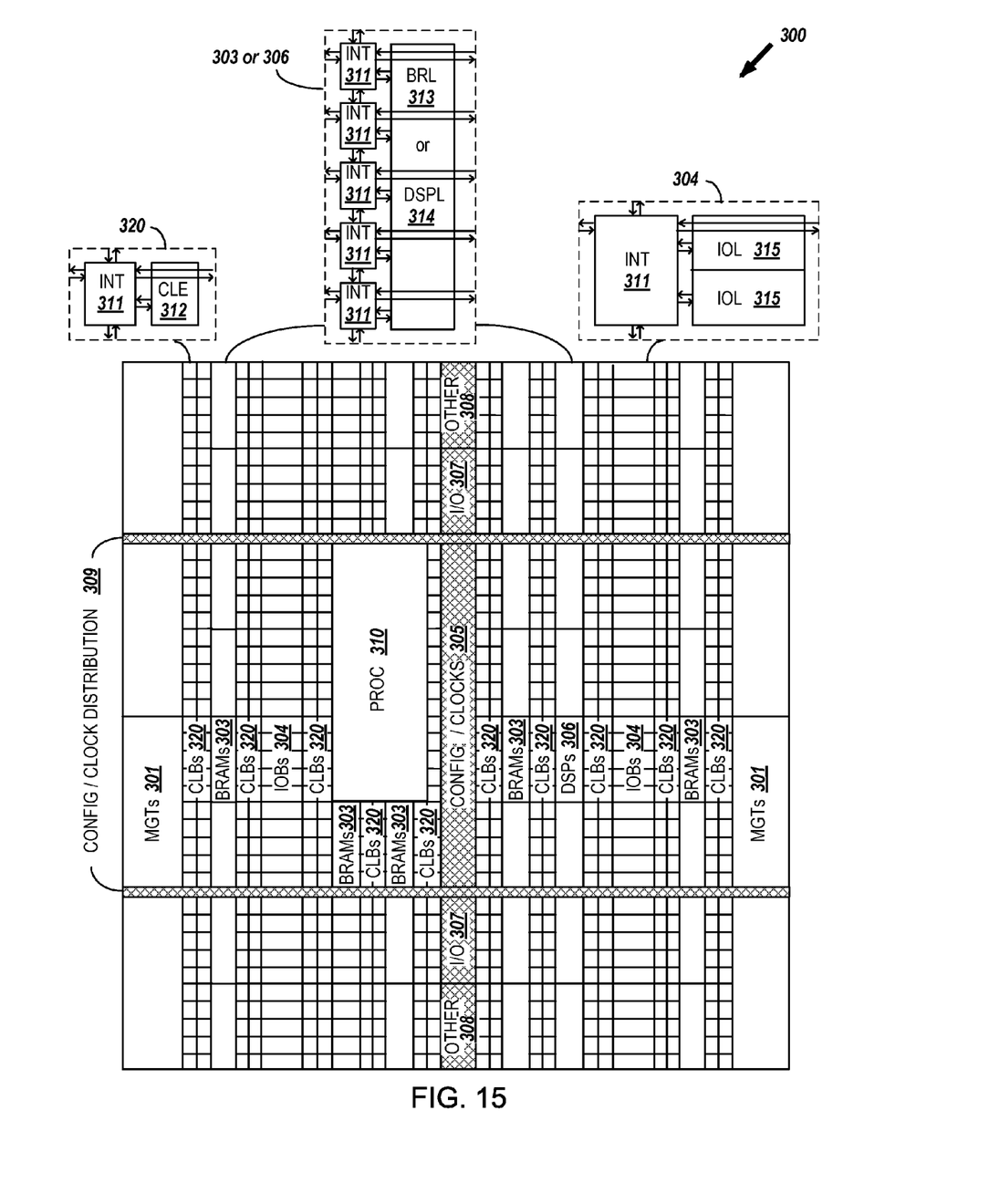
FIG. 15 is a block diagram of an example programmable logic integrated circuit that may be configured to implement pilot symbol modulation and decoding in accordance with various embodiments of the invention.

FIG. 15 is a block diagram of an example programmable logic integrated circuit that may be configured to implement pilot symbol modulation and decoding in accordance with various embodiments of the invention. This particular example illustrates an FPGA programmable logic architecture (300) that includes a large number of different programmable tiles including multi-gigabit transceivers (MGTs 301), configurable logic blocks (CLBs 320), random access memory blocks (BRAMs 303), input/output blocks (IOBs 304), configuration and clocking logic (CONFIG/CLOCKS 305), digital signal processing blocks (DSPs 306), specialized input/output blocks (I/O 307), for example, e.g., clock ports, and other programmable logic 308 such as digital clock managers, analog-to-digital converters, system monitoring logic, and so forth. Some FPGAs also include dedicated processor blocks (PROC 310) and internal and external reconfiguration ports (not shown).

In some FPGAs, each programmable tile includes a programmable interconnect element (INT 311) having standardized connections to and from a corresponding interconnect element in each adjacent tile. Therefore, the programmable interconnect elements taken together implement the programmable interconnect structure for the illustrated FPGA. The programmable interconnect element INT 311 also includes the connections to and from the programmable logic element within the same tile, as shown by the examples included at the top of FIG. 15.

For example, a CLB 320 can include a configurable logic element CLE 312 that can be programmed to implement user logic plus a single programmable interconnect element INT 311. A BRAM 303 can include a BRAM logic element (BRL 313) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 306 can include a DSP logic element (DSPL 314) in addition to an appropriate number of programmable interconnect elements. An IOB 304 can include, for example, two instances of an input/output logic element (IOL 315) in addition to one instance of the programmable interconnect element INT 311. As will be clear to those of skill in the art, the actual I/O pads connected, for example, to the I/O logic element 315 are manufactured using metal layered above the various illustrated logic blocks, and typically are not confined to the area of the input/output logic element 315.

In the pictured embodiment, a columnar area near the center of the die (shown shaded in FIG. 15) is used for configuration, clock, and other control logic. Horizontal areas 309 extending from this column are used to distribute the clocks and configuration signals across the breadth of the FPGA.

Some FPGAs utilizing the architecture illustrated in FIG. 15 include additional logic blocks that disrupt the regular columnar structure making up a large part of the FPGA. The additional logic blocks can be programmable blocks and/or dedicated logic. For example, the processor block PROC 310 shown in FIG. 15 spans several columns of CLBs and BRAMs.

It is noted that FIG. 15 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 15 are purely exemplary. For example, in an actual FPGA more than one adjacent column of CLBs is typically included wherever the CLBs appear, to facilitate the efficient implementation of user logic.

Figure 16:
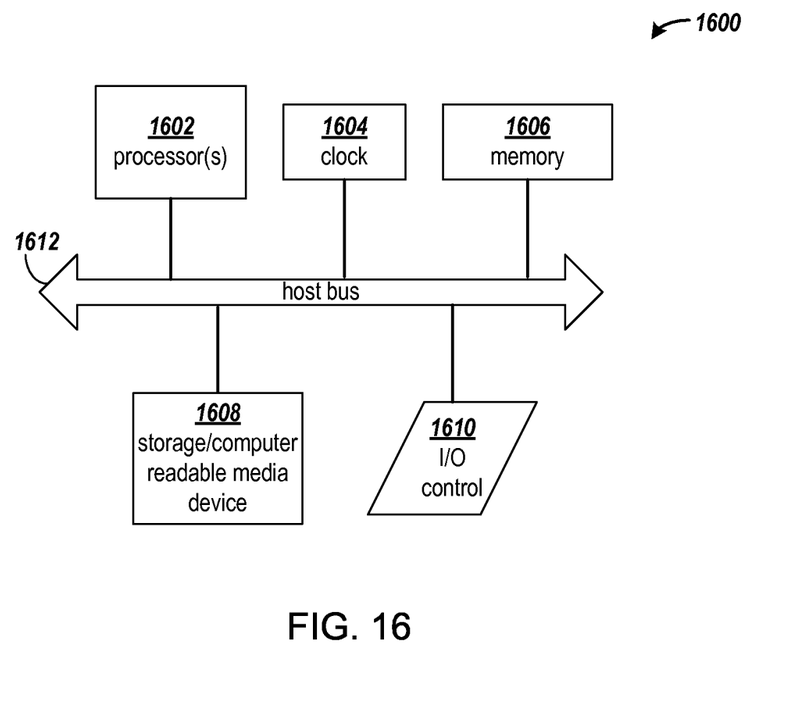
FIG. 16 is a block diagram of an example computing arrangement on which the processes described herein may be implemented.

FIG. 16 is a block diagram of an example computing arrangement on which the processes described herein may be implemented using a general purpose processor. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Processor computing arrangement 1600 includes one or more processors 1602, a clock signal generator 1604, a memory unit 1606, a storage unit 1608, and an input/output control unit 1610 coupled to host bus 1612. The arrangement 1600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 1602 may be one or more general purpose processors, or a combination of one or more general purpose processors and suitable co-processors, or one or more specialized processors (e.g., RISC, CISC, pipelined, etc.).

The memory arrangement 1606 typically includes multiple levels of cache memory, and a main memory. The storage arrangement 1608 may include local and/or remote persistent storage such as provided by magnetic disks (not shown), flash, EPROM, or other non-volatile data storage. The storage unit may be read or read/write capable. Further, the memory 1606 and storage 1608 may be combined in a single arrangement.

The processor arrangement 1602 executes the software in storage 1608 and/or memory 1606 arrangements, reads data from and stores data to the storage 1608 and/or memory 1606 arrangements, and communicates with external devices through the input/output control arrangement 1610. These functions are synchronized by the clock signal generator 1604. The resource of the computing arrangement may be managed by either an operating system (not shown), or a hardware control unit (not shown).

The present invention is thought to be applicable to a variety of multicarrier communication systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims and their equivalents.

What is claimed is:

1. A method of communicating a data value and pilot tone within the same communication sub-carrier of a communication channel, comprising:
    selecting a first reference phase corresponding to the data value;
    wherein the selecting the first reference phase includes retrieving a phase corresponding to the data value from a table, the table mapping a set of data values to a set of reference phases;
    generating a pilot tone having the first reference phase;
    transmitting the generated pilot tone;
    receiving the transmitted pilot tone;
    determining a phase of the received pilot tone;
    determining the data value from the determined phase of the received pilot tone; wherein the determining of the data value includes:
        determining from the set of reference phases, a second reference phase that is closest to the determined phase of the received pilot tone; and
        retrieving a data value corresponding to the second reference phase from the table;
    storing the determined data value in an electronic storage medium;
    training the communication channel to establish a synchronized phase;
    determining a difference between the determined phase of the received pilot tone and the second reference phase; and
    in response to the difference being greater than a selected threshold, repeating training and transmitting steps.

2. The method of claim 1, further comprising:
    determining channel state information from the received pilot tone; and
    storing the channel state information in the electronic storage medium.

3. The method of claim 2, wherein the determining channel state information from the received pilot tone includes determining a difference between an amplitude of an expected pilot tone, corresponding to the generated pilot tone, and an amplitude of the received pilot tone.

4. The method of claim 1, wherein the reference phase of the pilot tone is restricted to a set of phase values consisting of a first phase and a second phase, the first phase and second phases being separated by 180 degrees.

5. The method of claim 4, wherein the determining the phase of the received pilot tone comprises:
    determining a real component of the received pilot tone;
    determining a sign of the real component;
    in response to the sign being positive, selecting the first phase; and
    in response to the sign being negative, selecting the second phase.

6. The method of claim 1, further comprising
    wherein selecting the first reference phase corresponding to the data value includes selecting the first reference phase from a set of reference phases;
    communicating a number of phase values included in the set of reference phases; and
    calculating a set of phase values from the number of phase values.

7. The method of claim 6, further comprising
    restricting the reference phase of the pilot tone to a set of different phases;
    transmitting a second data value indicating a number of the different phases in the set;
    receiving the second data value; and
    generating the set of reference phases from the second data value.

8. The method of claim 2, wherein determining channel state information from the received pilot tone includes:
    determining a difference between the second reference phase and the determined phase of the received pilot tone.

9. A communication system for pilot tone assisted modulation of data signals, comprising:
    a transmitter that includes:
        a mapping block configured to:
            modulate a data signal into a plurality of representations using two or more subcarrier mapping schemes indicated in a mapping index table; and
            select one of the plurality of representations having a peak-to-average power ratio over a period of time lower than a threshold; and
        a pilot tone encoding block coupled to the mapping block and configured to:
            select one or more reference phases that correspond to a binary representation of the mapping scheme of the selected one of the plurality of representations from the mapping index table;
            generate a pilot tone symbol for each of the one or more references phases, the pilot tone symbol having a phase equal to the reference phase; and
        a transmission block coupled to the mapping block and to the pilot tone encoding block, the transmission block configured to transmit the selected one of the plurality of representations and the pilot tone symbol on two or more subcarriers; and a signal receiver for receiving one or more signal representations and one or more modulated pilot tone symbols on a plurality of subcarriers, the signal receiver including:
a pilot tone decoding block coupled to receive the one or more modulated pilot tone symbols and configured to:
determine a phase of each of the one or more modulated pilot tone symbols;
determine a data value from the phase of each of the one or more modulated pilot tone symbols;
for each of the signal representations, determine a mapping scheme corresponding to a mapping of the one or more signal representations from the data values of the one of more modulated pilot tone symbols;
determine, for each of the one or more modulated pilot tone symbols, the data value from the phase of the modulated pilot tone symbol by performing the operations of:
comparing the phase of the modulated pilot tone symbol to a set of reference phases;
selecting a corrected phase from the set of reference phases for each of the one or more modulated pilot tone symbols, the corrected phase having a value closest to the phase of the modulated pilot tone symbol; and
retrieving a data value for the corrected phase from a reference table; and
determine, for each of the one or more modulated pilot tone symbols, channel conditions based on a difference between the phase of the modulated pilot tone symbol and the corrected phase; and
a demapping block coupled to the pilot tone decoding block, the demapping block configured to demodulate each signal representation using the corresponding mapping scheme to produce a data signal: and
wherein:
the transmitter and the signal receiver are configured to synchronize a data channel based on the determined channel conditions; and
the signal receiver is configured to, for each of the one or more modulated pilot tone symbols, in response to the difference between the phase of the modulated pilot tone symbol and the corrected phase being greater than a selected threshold, cause the transmitter to retransmit a pilot tone symbol corresponding to the modulated pilot tone symbol.

10. The communication transmitter of claim 9, wherein the mapping block is further configured to modulate data signals into a plurality of OFDM representations.

11. The communication transmitter of claim 9, wherein:
the reference phase is restricted to a set consisting of N phases.

12. The communication transmitter of claim 11, wherein the transmission block is further configured to transmit the number N on the two or more subcarriers.

13. The communication transmitter of claim 11, wherein:
the pilot tone encoding block is further configured to divide the binary representation of the mapping scheme into bitgroups of size $\log_2 N$; and
select a reference phase corresponding to each bitgroup.

14. A communication receiver for pilot tone assisted demodulation of data signals, comprising:
a signal receiver for receiving one or more signal representations and one or more modulated pilot tone symbols on a plurality of subcarriers, the signal receiver including:
a pilot tone decoding block coupled to receive the one or more modulated pilot tone symbols and configured to:
determine a phase of each of the one or more modulated pilot tone symbols;
determine a respective data value from the respective phase of each of the one or more modulated pilot tone symbols;
for each of the signal representations, determine a mapping scheme corresponding to a mapping of the one or more signal representations from the data values of the one of more modulated pilot tone symbols; and
for each of the one or more modulated pilot tone symbols:
determine the respective data value from the phase of the modulated pilot tone symbol by performing the operations of:
comparing the phase of the modulated pilot tone symbol to a set of reference phases;
selecting a corrected phase from the set of reference phases for the modulated pilot tone symbol, the corrected phase having a value closest to the phase of the modulated pilot tone symbol; and
retrieving a data value for each corrected phase from a reference table;
determine channel conditions based on a difference between the phase of the modulated pilot tone and the corrected phase;
synchronize a data channel with a transmitter, from which the modulate pilot tone is received, and the signal receiver are configured to synchronize a data channel based on the determined channel conditions based on the determined channel conditions; and
in response to the difference between the phase of the modulated pilot tone symbol and the corrected phase being greater than a selected threshold cause the transmitter to retransmit the modulated pilot tone symbol to the signal receiver; and
a demapping block coupled to the pilot tone decoding block, the demapping block configured to demodulate each signal representation using the corresponding mapping scheme to produce a data signal.

15. The communication receiver of claim 14, wherein:
the phase of each of the one or more modulated pilot tone symbols is restricted to a set of values consisting of a first phase and a second phase; and
for each of the one or more modulated pilot tone symbols, the pilot tone decoding block is configured to determine a phase by:
determining a real component of the modulated pilot tone symbol;
in response to the sign of a real component having a positive sign, concluding the phase is the first phase; and
in response to the sign of a real component having a negative sign, concluding the phase is the second phase.

16. The communication receiver of claim 14, wherein the set of reference phases contains four reference phases.

* * * * *